(12) United States Patent
Wickramasinghe et al.

(10) Patent No.: US 11,414,008 B2
(45) Date of Patent: Aug. 16, 2022

(54) VEHICLE LIGHT GUIDANCE SYSTEM AND METHOD

(71) Applicant: JAGUAR LAND ROVER LIMITED, Coventry (GB)

(72) Inventors: Shammika Wickramasinghe, Warwickshire (GB); Nicholas Ridler, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/084,863

(22) PCT Filed: Feb. 28, 2017

(86) PCT No.: PCT/EP2017/054607
§ 371 (c)(1),
(2) Date: Sep. 13, 2018

(87) PCT Pub. No.: WO2017/157651
PCT Pub. Date: Sep. 21, 2017

(65) Prior Publication Data
US 2019/0054852 A1 Feb. 21, 2019

(30) Foreign Application Priority Data
Mar. 18, 2016 (GB) ..................................... 1604591

(51) Int. Cl.
*B60Q 1/24* (2006.01)
*F21S 41/663* (2018.01)
(Continued)

(52) U.S. Cl.
CPC .............. *B60Q 1/24* (2013.01); *F21S 41/663* (2018.01); *H04W 4/40* (2018.02);
(Continued)

(58) Field of Classification Search
CPC ..... B60Q 2400/40; B60Q 1/24; F21S 41/663; H04W 4/40
See application file for complete search history.

(56) References Cited

U.S. PATENT DOCUMENTS

2005/0007789 A1* 1/2005 Schenk ..................... B60Q 1/12
362/465
2006/0046684 A1* 3/2006 Kameyama .............. B60Q 1/50
455/345
(Continued)

FOREIGN PATENT DOCUMENTS

CN 103707801 A 4/2014
DE 202005017408 U 1/2006
(Continued)

OTHER PUBLICATIONS

International Search Report and Written Opinion, PCT/EP2017/054607, 22 pages, dated Apr. 19, 2017.
(Continued)

*Primary Examiner* — Alexander H Taningco
*Assistant Examiner* — Pedro C Fernandez
(74) *Attorney, Agent, or Firm* — McCoy Russell LLP (57) ABSTRACT

A method of guiding a vehicle user approaching or exiting a vehicle. The method comprises projecting, by means of illumination from one or more light sources associated with the vehicle, a distinct illuminated path on the ground. The distinct illuminated path on the ground extends between the vehicle and a location remote from the vehicle. A light guidance system (10) for a vehicle (12), the system comprising one or more light sources (20, 22, 24, 26, 28, 30) associated with the vehicle and configured to project at least part of a distinct illuminated path (64) on the ground between the vehicle and a location remote from the vehicle.

16 Claims, 6 Drawing Sheets

(51) Int. Cl.
*H04W 4/40* (2018.01)
*H04W 4/80* (2018.01)
*H04W 84/12* (2009.01)

(52) U.S. Cl.
CPC ........... *B60Q 2400/40* (2013.01); *H04W 4/80* (2018.02); *H04W 84/12* (2013.01)

(56) References Cited

U.S. PATENT DOCUMENTS

| | | | |
|---|---|---|---|
| 2012/0194356 A1 | 8/2012 | Haines et al. | |
| 2014/0091709 A1* | 4/2014 | Choi | B60Q 1/04 315/82 |

FOREIGN PATENT DOCUMENTS

| | | |
|---|---|---|
| DE | 102007050830 A1 | 4/2009 |
| DE | 102013016347 A1 | 4/2014 |
| DE | 102013012217 A1 | 1/2015 |
| DE | 102013021941 A | 7/2015 |
| EP | 1506893 A2 | 2/2005 |
| EP | 1506893 A3 | 4/2006 |
| EP | 2384936 A1 | 11/2011 |
| FR | 2929193 A1 | 10/2009 |
| JP | 2012030613 A | 2/2012 |
| WO | 2005035308 A1 | 4/2005 |
| WO | 2014206626 A1 | 12/2014 |

OTHER PUBLICATIONS

Search and Examination Report, GB1604591.6, 7 pages, dated Sep. 23, 2016.
State Intellectual Property Office of the People's Republic of China, Office Action and Search Report Issued in Application No. 201780017951.1, dated Feb. 19, 2021, 22 pages.

* cited by examiner

VEHICLE LIGHT GUIDANCE SYSTEM AND METHOD

CROSS-REFERENCE TO RELATED APPLICATIONS

This application is a 371 of International Application No. PCT/EP2017/054607, filed Feb. 28, 2017, which claims priority to GB Patent Application 1604591.6, filed Mar. 18, 2016, the contents of both of which are incorporated by reference herein in their entirety.

TECHNICAL FIELD

The present disclosure relates to a light guidance system and method for guiding a user when entering or exiting a vehicle, and to a vehicle comprising a light guidance system.

BACKGROUND

It is known to provide exterior lights on a vehicle for assisting a vehicle user when entering or exiting the vehicle. One example of such lights are so-called 'puddle lights', which illuminate the ground immediately adjacent to the vehicle doors to highlight any puddles or other obstacles adjacent to the door to the user when exiting the vehicle.

It is also known to utilise the exterior lights on a vehicle to assist a user approaching the vehicle. For example, systems are known in which the driver's key fob can be used to activate the head lights of the vehicle remotely. This can be useful for locating the vehicle in a car park or for illuminating any puddles or obstacles generally in front of the vehicle when the user approaches the vehicle.

Whilst the prior art systems are useful for providing general illumination in the vicinity of the vehicle, a particular problem has been identified, whereby a vehicle user exiting a vehicle in the dark may find it difficult to see their way to a front door or to a parking meter, for example.

Against this background the present invention aims to provide a more sophisticated vehicle lighting system and method of providing enhanced guidance and illumination for users when entering or exiting a vehicle.

SUMMARY OF THE INVENTION

According to an aspect of the invention, there is provided a method of guiding a vehicle user approaching or exiting a vehicle, the method comprising projecting, by means of illumination from one or more light sources associated with the vehicle, a distinct illuminated path on the ground extending between the vehicle and a location remote from the vehicle.

The projection of a distinct illuminated path on the ground assists the user when navigating the terrain in the vicinity of a vehicle. This is particularly beneficial in conditions of low ambient light. The projected illumination guides the user when moving between the vehicle and the remote location. Reference to movement between the vehicle and the remote location here, and throughout the specification, is intended to include movement in a direction away from the vehicle and movement in a direction towards the vehicle.

The prior art systems are not capable of projecting a distinct path on the ground. Puddle lights for example provide diffuse illumination immediately adjacent to the vehicle, whilst headlights or other vehicle exterior lights provide general illumination in the vicinity of the vehicle.

Preferably, the distinct illuminated path projected on the ground corresponds substantially to an actual path traversed (e.g. the path walked) by the user between the vehicle and the remote location.

The illumination of the path on the ground substantially avoids illumination of the person. This is advantageous since it avoids the person being dazzled by the illumination, which would be the case if the illumination was provided by standard head lights, for example as in the prior art. It also provides a discreet lighting system that is unobtrusive to other people or vehicles in the vicinity of the vehicle.

The present invention is particularly useful for guiding a user when exiting or approaching the vehicle. The user is therefore able to see any obstacles such as puddles or potholes that may exist between the vehicle and the remote location on the path that he or she is following.

The method may comprise tracking the movement of the user in the vicinity of the vehicle. For example, after parking and exiting the vehicle, the system may track the movement of the user as the user walks towards the remote location, e.g. towards a front door or a parking meter, and illuminate the path on the ground taken by the user. As will be discussed further later, the user's position relative to the vehicle may be tracked by communicating with a mobile communications device in the possession of the user and/or by means of one or more cameras associated with the vehicle.

The method may comprise progressively projecting the distinct illuminated path on the ground as the user moves between the vehicle and the remote location. Accordingly, the actual path of the user may be illuminated progressively on the ground as the user moves between the vehicle and the remote location. This ensures that appropriate lighting is provided at the user's location and the illumination on the ground follows a path or route chosen by the user.

In a particularly advantageous implementation, the method may involve continuing to project the distinct illuminated path on the ground when the user arrives at the vehicle or at the location remote from the vehicle. Accordingly, the actual path traversed by the user remains illuminated when the user arrives at the vehicle or at the remote location, depending upon their direction of travel. The user's path back to their vehicle or back to the remote location therefore remains illuminated. This is highly advantageous if the user needs to retrace their steps to retrieve a dropped item, for example. It is also advantageous in cases where the user needs to return to the vehicle, for example when unloading luggage or shopping, where multiple trips to/from the vehicle may be required. It is further advantageous in the context of visiting a parking meter, for example, as the illuminated path guides the user back to their vehicle.

The system may be configured to deactivate the illumination when the user moves beyond a predefined distance from the vehicle. Accordingly, the path may remain illuminated until the user reaches their destination after which the illumination may cease. Equally, the system may be configured to activate the illumination when the user is within a predefined distance from the vehicle, thereby guiding the user towards the vehicle. The predefined distance may be a predefined radius centred on the vehicle.

The system may be configured to cease illumination after a predetermined time period. For example, the illuminated path may remain illuminated for the predetermined time period after which illumination may cease. This may be convenient when the user is approaching a front door as it provides illumination whilst the user finds their door keys. This is also convenient in cases where the user may exceed the predetermined distance from the vehicle, but then shortly needs to retrace their steps back to the vehicle for example if the user needs to retrieve a dropped item. The predetermined time period and/or the predetermined distance may advantageously be set by the user.

The distinct illuminated path projected on the ground may correspond to a predefined stored path. Accordingly, the method may comprise storing a predefined path extending between the vehicle and the location remote from the vehicle. For example, the stored predefined path may correspond to an actual path previously traversed by the user between the vehicle and the remote location. The method may advantageously comprise illuminating the stored/remembered path prior to the user taking said path.

A typical path may be the path between the vehicle and the front door at a user's home. The method may involve determining the location of the vehicle, for example using the vehicle's GPS system, and illuminating the remembered path prior to the vehicle user exiting the vehicle or when the vehicle user approaches the vehicle. Such functionality is particularly advantageous as the user's route between the vehicle and remote location may be illuminated in advance. Accordingly, the method may comprise projecting the distinct illuminated path on the ground, or commencing projection of at least part of the distinct illuminated path on the ground, when the user exits the vehicle or when the user is detected at the location remote from the vehicle.

The method may comprise projecting the distinct illuminated path on the ground by selectively activating one or more light sources of a plurality of light sources arranged in a matrix. As will be discussed in further detail below and in the specific examples, the present invention may be implemented using matrix light units, such as headlights, reverse lights, or side lights comprising a matrix of LEDs. Such light units may be employed for other uses in vehicles, for example in adaptive lighting systems. In this regard, the present invention may provide new and advantageous additional functionality for such light units.

In the context of matrix lights, the method may comprise progressively activating selected light sources in the matrix such that the distinct illuminated path is progressively projected on the ground. The method may further comprise selectively activating the light sources in the matrix in dependence upon a detected location of the vehicle user in the vicinity of the vehicle, wherein the light sources are selectively activated to illuminate the ground at the detected location of the user.

According to a further aspect of the invention, there is provided a light guidance system for a vehicle, the system comprising one or more light sources associated with the vehicle and configured to project at least part of a distinct illuminated path on the ground between the vehicle and a location remote from the vehicle.

The one or more light sources may be provided at any suitable location on the vehicle. In certain configurations, the light sources are arranged such that they are capable of providing illumination within a region substantially surrounding the vehicle, e.g. within a 360 degree radius of the vehicle. This allows the path of the user between the vehicle and the remote location to be illuminated irrespective of the position of the remote location relative to the vehicle.

It is particularly advantageous to utilise existing lighting equipment of the vehicle in the present system. For example, the system may employ one or more vehicle light units such as headlights, reverse lights, side lights and/or auxiliary lights of the vehicle. The headlights and reverse lights may already provide a substantially white light source, which is particularly attractive for illuminating a path.

The system may comprise one or more vehicle light units having a plurality of light sources arranged in a matrix, for example a matrix of LEDs (Light Emitting Diodes). Existing headlights and/or reverse lights of modern vehicles may already utilise such equipment, as mentioned above. Each light source in the matrix may be arranged to illuminate a distinct region of the ground in the vicinity of the vehicle. One or more of the light sources in the matrix may be selectively activated to project at least part of the distinct illuminated path on the ground.

The path of the user may be illuminated by activating specific light sources or groups of light sources (e.g. specific LEDs or groups of LEDs in the matrix) to illuminate specific regions of the ground in the vicinity of the vehicle. As the user moves relative to the vehicle, additional light sources or groups of light sources in the matrix may be illuminated to follow the path of the user by illuminating further specific regions on the ground according to the user's path.

In the context of matrix lights, as described above, the light sources (e.g. the LEDs) may be arranged in a plurality of rows spaced apart in a vertical direction, and in a plurality of columns spaced apart in a horizontal direction. The lower rows of light sources may suitably illuminate regions of the ground relatively close to the vehicle, whilst the upper rows of light sources may suitably illuminate regions of the ground relatively further from the vehicle.

By activating only certain light sources in upper rows of the matrix, for example, it is possible to illuminate regions of the ground that are spaced apart from the vehicle without also illuminating regions of the ground that are closer to the vehicle. It is therefore possible to illuminate distinct regions of the ground in the vicinity of the vehicle without substantially illuminating nearby regions. This allows spatially-distinct regions of the ground to be selectively illuminated. The sequential illumination of a plurality of such spatially-distinct regions allows the system to illuminate the path of the user as he/she moves relative to the vehicle.

Matrix lights as described above allow static light sources to be used to create a moving field of illumination. Alternatively, or additionally, the one or more light sources may themselves be configured to move, for example to swivel or rotate to track the movement of the user relative to the vehicle. The individual light sources of matrix lights may also be arranged to move, e.g. swivel in certain implementations.

In an embodiment, the vehicle may be provided with lasers, employed to illuminate the path of the user. The lasers may be arranged in the vicinity of the head lights and/or reverse lights of the vehicle, and may advantageously be used to provide a high resolution moving region of illumination. For example, the lasers may be configured to illuminate a high definition path corresponding to the actual path of the user. The functionality of the lasers may additionally, or alternatively, extend to the illumination of footprints or other shaped regions on the ground, corresponding to the actual path of the user.

In certain embodiments, the light sources may be activated sequentially and in combination, such that as additional light sources are activated, the light sources that were activated previously remain on. Accordingly the distinct path illuminated on the ground increases in length as the user moves, and the path along which the user has travelled remains illuminated. This advantageously highlights the path along which the user has moved, which is advantageous for the reasons already discussed. Alternatively, the previously-activated light sources may be deactivated as additional light sources are activated to track the user's movement. This results in a sweeping effect similar to a moving spotlight. This advantageously reduces the energy consumption of the system. The user may select between these modes of operation according to preference.

The light guidance system may comprise location means for determining the location of a vehicle user relative to the vehicle. The system may additionally comprise control means configured to selectively activate the one or more light sources to illuminate the ground at the location of the user. As previously described in the context of the method, the system may be configured to track the movement of the vehicle user between the vehicle and the remote location. Advantageously, the system may be configured to progressively illuminate the ground along an actual path traversed by the user.

The control means may comprise a controller configured to selectively active the one or more light sources.

The location means for tracking the movement of the user may comprise any suitable locating means or locating devices. For example, in certain embodiments the system may comprise one or more cameras associated with the vehicle and configured to monitor the position of the user relative to the vehicle. Cameras are often already associated with the windscreen of vehicles, and such existing cameras may conveniently be employed for use additionally with the present invention.

Alternatively, or additionally, the system may comprise suitable transmitter/receiver units, associated with the vehicle and with the user. For example, the user may carry a mobile device and the system may be configured to track the position of the user by determining the location of the mobile device. A variety of communications protocols may be employed for this purpose. For example, Wi-Fi, Bluetooth® or GPS (Global Position System) are well known protocols that may be used.

The mobile device may conveniently be a suitable consumer electronics device, such as a mobile phone for example, as such devices are commonly provided with Wi-Fi, Bluetooth® and/or GPS functionality. The remote device may be suitably paired with the system so that the system recognises the device, and hence recognises the user when the device is in the vicinity of the vehicle.

As GPS requires communications with satellites, which may not always be available or may be slow, localised communications protocols such as Wi-Fi and Bluetooth® are particularly advantageous. In such cases, the location of the mobile device (and hence the location of the user) may be determined through a suitable triangulation process. Accordingly, the system may comprise a plurality of transmitters/receivers associated with the vehicle (e.g. a plurality of Wi-Fi or Bluetooth® transmitter/receiver units). The various units may be positioned at predefined and spaced-apart locations in the vehicle, and the position of the mobile device relative to the vehicle can be determined by comparing the relative signal strengths between the remote device and the respective units. Optimally, three such units may be associated with the vehicle, which enables the location of the user to be pinpointed precisely. Two units may be located, for example, on the left and right sides of the vehicle respectively, and the third unit may be located in front or behind the two units. The location of the user may additionally or alternatively be determined based upon the relative time of flight of the signals received by each receiver unit from the remote device. The time of flight refers to the time taken for each signal to travel from the remote device to the respective transmitter/receiver unit associated with the vehicle, the time of flight being indicative of the distance of the remote device from the respective unit.

In other implementations, the system may track the position of the user using so-called PEPS (Passive Entry/Passive Start) technology or ePEPS (enhanced Passive Entry/Passive Start) technology. This technology is already included in some vehicles to enable hands-free interaction with the vehicle. PEPS/ePEPS systems incorporate a transmitter/receiver within the key fob, which allows the vehicle to determine the exact position of the key fob relative to the vehicle in x, y and z coordinates. ePEPS technology refers to an arrangement in which the key fob includes an ultra-wideband transmitter/receiver for communication with the vehicle. The use of ultra-wideband frequencies enables the vehicle to determine the position of the key fob to a relatively high degree of accuracy.

It will be appreciated from the above description that a number of systems can be employed to track the location of the user, and the present invention is not limited to any particular implementation.

The system may be arranged to determine co-ordinates of the remote device by any means discussed above. The system may comprise a look-up table or an algorithm configured to convert the determined co-ordinates into optical angles, the optical angles indicating the relative position of the remote device compared to the vehicle. In an embodiment, the optical angles indicate the relative position of the mobile device compared to a specific reference point on the vehicle. Each optical angle may correspond to one or more specific light sources, such that the system determines which one or more light sources to illuminate based on the co-ordinates of the mobile device. As previously described, the light source may be an existing vehicle light, such as a head light or a reverse light, a single LED in an array of LEDs, or a laser.

Alternatively, the system may be configured to map the region of ground surrounding the vehicle. This area surrounding the vehicle may thus be divided into a plurality of spatially-distinct regions or zones. Each zone may be illuminated by activating a specific light source or combination of light sources associated with the zone. When the user is detected in a particular zone, the system may activate the appropriate light source(s) corresponding to said zone. As the user moves from one zone to the next, the appropriate light sources associated with the zone into which the user moves may be activated.

The map may be a predefined map stored within a memory device of the system. The light sources associated with each zone may also be predefined and stored within the memory device. A look-up table and/or algorithms correlating the respective zones with the associated light sources may be stored in the memory device. The system may comprise a controller or processor configured to activate the appropriate light source based upon the detected location of the user by reference to the look-up table or using the algorithms.

In certain embodiments, the system may comprise a plurality of sensors associated with the respective zones. The sensors may be configured to detect the presence of the user in its associated zone. When the sensor detects the presence of the user in its associated zone, the controller may be configured to activate the light source(s) corresponding to said zone. The sensors may be any suitable sensors, for example proximity sensors, thermal sensors, movement sensors, optical sensors etc, or a combination of different sensors.

According to an aspect of the present invention, there is provided a vehicle lighting system comprising one or more light sources associated with the vehicle, and means for tracking the movement of a vehicle user relative to the vehicle, wherein the system is configured to track the movement of the vehicle user between the vehicle and a location remote from the vehicle and to illuminate a distinct path on the ground followed by the user between the vehicle and the remote location.

According to a further aspect of the present invention, there is provided a system or method for guiding a user when exiting or approaching a vehicle, wherein the system is configured to track the movement of the vehicle user in the vicinity of the vehicle and provide distinct and targeted illumination of the ground at the user's location as the user moves between the vehicle and a location remote from the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
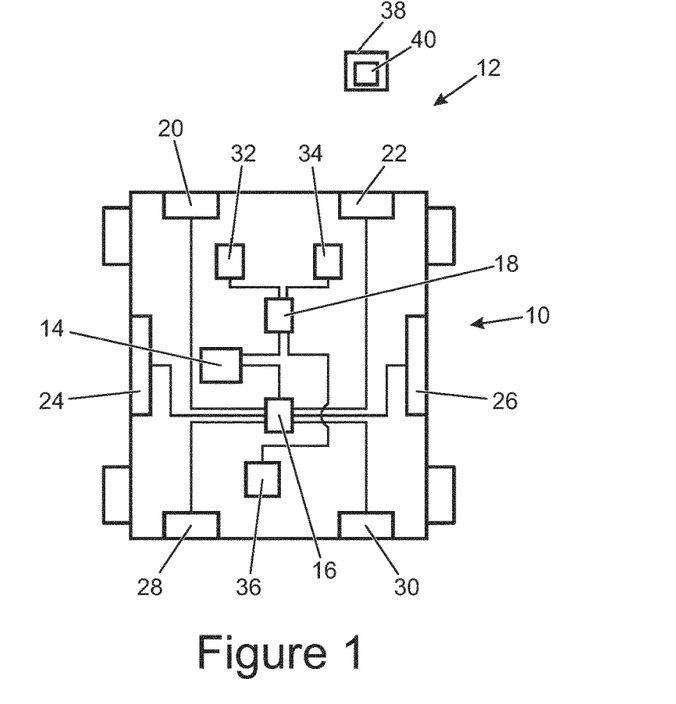
FIG. 1 is a schematic plan view of a vehicle having a vehicle lighting system of one embodiment of the invention.

FIG. 1 shows a schematic view of a light guidance system, or vehicle lighting system 10, of a vehicle 12. The vehicle lighting system 10 comprises control means, in the form of an Electronic Control Unit (ECU) 14, that is connected to a Lighting Control Module (LCM) 16 and a Communications Control Module (CCM) 18. The LCM 16 is configured to communicate with a number of light sources arranged around the vehicle, the light sources comprising: a left head light 20; a right head light 22; a left side light 24; a right side light 26; a left reverse light 28; and a right reverse light 30. The CCM 18 is connected to location means in the form of three transmitter/receivers; a first transmitter/receiver 32 being located at a front left-hand position of the vehicle 12, a second transmitter/receiver 34 being located at a front right-hand region of the vehicle 12 and a third transmitter/receiver 36 being located at a central, rear position of the vehicle 12.

A remote device, or mobile communications device, 38 can be connected to the vehicle lighting system 10, the remote device 38 being a mobile phone belonging to a user, for example. The remote device 38 is provided with a fourth transmitter/receiver 40, such that the remote device 38 can communicate with the transmitter/receivers 32, 34, 36 of the vehicle lighting system 10. Communication between the transmitter/receiver 40 of the remote device 38 and the transmitter/receivers 32, 34, 36 of the vehicle lighting system 10 is by way of Wi-Fi signals in this example, although other communication protocols such as Bluetooth® or PEPS/ePEPS may be used.

The user is able to connect the remote device 38 to the vehicle lighting system 10 by any appropriate means. Connection can be established through use of a dedicated app installed on the remote device 38 and/or by way of settings accessed through interaction with the human machine interface (HMI) of the vehicle 12. Optionally, the user may also choose to select automatic connection between the remote device 38 and the vehicle lighting system 10, such that the connection is automatically created in the event that the remote device 38 is detected by one or more of the transmitter/receivers 32, 34, 36 of the vehicle lighting system 10.

Figure 2:
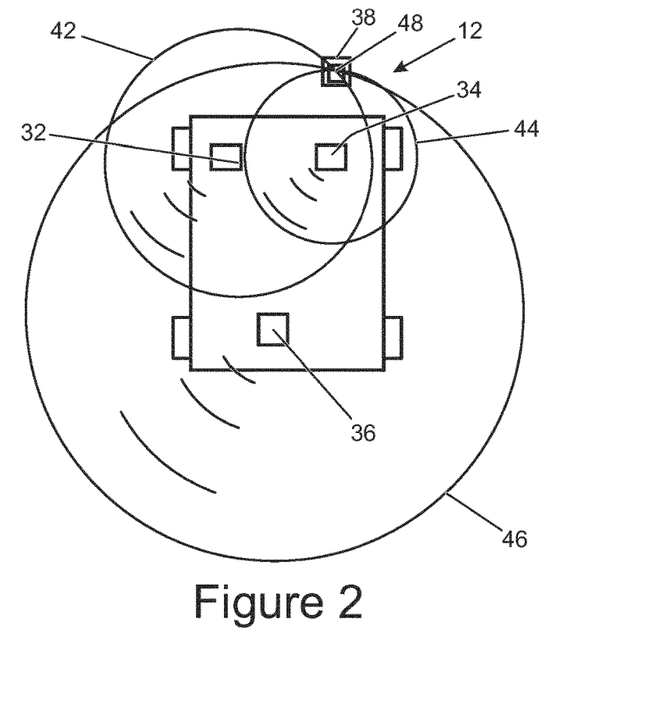
FIG. 2 is a schematic plan view of a transmitter/receiver arrangement of the vehicle lighting system of FIG. 1.

Referring to FIG. 2, the front left-hand, front right-hand and rear transmitter/receivers 32, 34, 36 of the vehicle lighting system 10 are shown in their respective positions in the vehicle 12. Upon activation of the connection between the remote device 38 and the vehicle lighting system 10, the transmitter/receivers 32, 34, 36 of the vehicle lighting system 10 are able to triangulate the position of the remote device 38 relative to the vehicle 12, and thus, the associated remote location of the user.

The process of triangulation allows for the location of the remote device 38 to be pinpointed, by way of analysis of the Wi-Fi signals transmitted from the remote device 38. Each transmitter/receiver 32, 34, 36 of the vehicle lighting system 10 detects the relative signal strength and/or time of flight of the Wi-Fi signals from the remote device 38, the signal strength and time of flight each being directly related to the distance of the remote device 38 from the respective transmitter/receiver 32, 34, 36. Referring to FIG. 2, which considers the arrangement in two dimensions for simplicity, a circle 42 is defined around the front left-hand transmitter/receiver 32 that has a radius corresponding to the distance between the transmitter/receiver 32 and the remote device 38. By comparing the circle 42 of the front left-hand transmitter/receiver 32 to circles 44, 46 corresponding to each of the front right-hand and rear transmitter/receivers 34, 36, the CCM 18 is able to identify the point of intersection 48 of the circles 42, 44, 46. The point of intersection 48 corresponds to the x, y and z co-ordinates of the remote device 38.

It will be appreciated that any method for locating the relative location of the remote device 38 compared to the vehicle 12 may be used. The vehicle lighting system 10 can optionally employ PEPS/ePEPS technology to track the location of the remote device 38. The system 10 may therefore utilise existing PEPS/ePEPS transmitter/receiver units in the vehicle 12 to determine x, y and z coordinates of a remote device, such as a key fob, in the user's possession.

Figure 3:
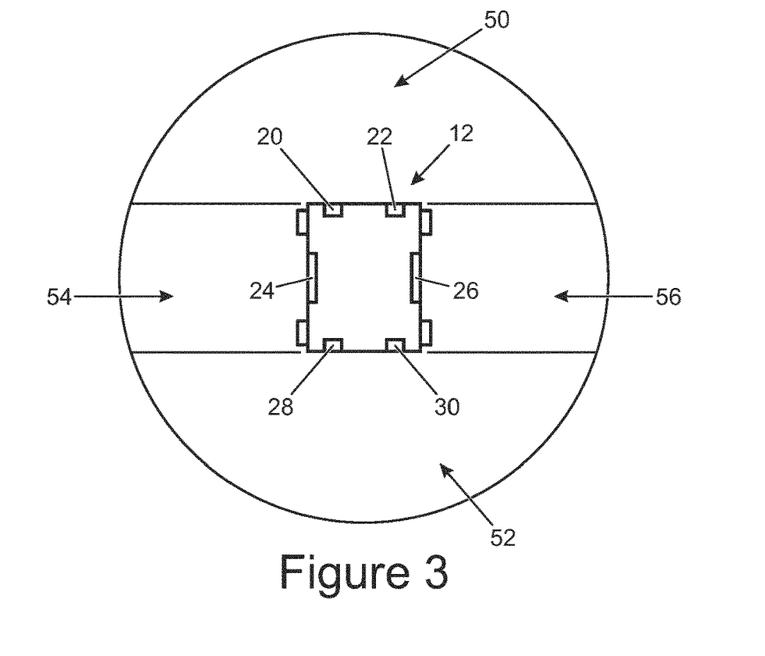
FIG. 3 is a schematic plan view of zones of illumination corresponding to light sources of the vehicle lighting system of FIG. 1.

In response to the determined location of the remote device 38, the ECU 14 commands the LCM 16 to control various aspects of the light sources, including controlling which light source to illuminate. FIG. 3 represents a plan view of a plurality of spatially-distinct regions on the ground around the vehicle 12 in the form of broad zones of illumination 50, 52, 54, 56, each zone of illumination 50, 52, 54, 56 corresponding to one or more light sources of the vehicle 12. The zones extend around the entirety of the vehicle exterior, such that the vehicle lighting system 10 is provided with 360° illumination capability.

A first zone 50 is positioned to the front of the vehicle 12, the illumination of which corresponds to illumination of the head lights 20, 22 of the vehicle 12. A second zone 52 is positioned to the rear of the vehicle 12, the illumination of the second zone 52 corresponding to illumination of the reverse lights 28, 30 of the vehicle 12. An illuminable left side zone 54 and a right side zone 56 correspond to the left side light 24 and the right side light 26 respectively.

Figure 4:
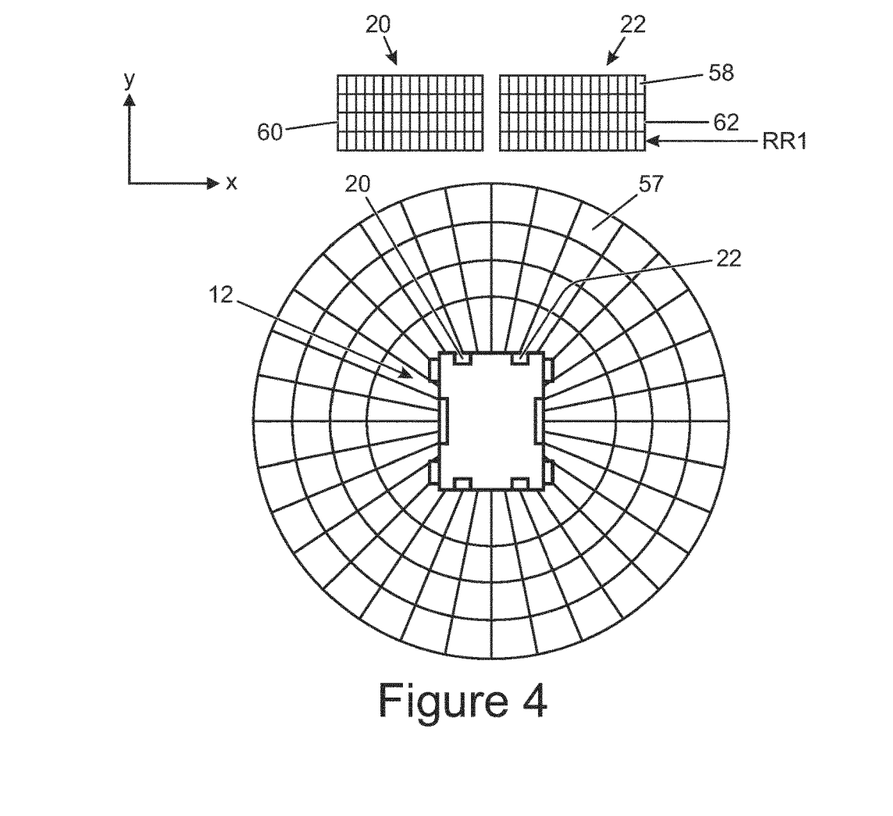
FIG. 4 is a schematic plan view of illuminable spatially-distinct regions corresponding to LED matrices of an embodiment of the vehicle lighting system of FIG. 1, along with a schematic rear view of the LED matrices of a right head lamp and a left head lamp of the vehicle lighting system.

The broad zones of illumination 50, 52, 54, 56 are further divided to provide a greater number of spatially-distinct regions 57, as shown in FIG. 4. The division of the zones of illumination 50, 52, 54, 56 is by way of pixel technology, whereby one or more of each of the head lights 20, 22, reverse lights 28, 30 and side lights 24, 26 are comprised of an array of LEDs 58. In addition to a plan view of the vehicle 12, FIG. 4 illustrates a possible LED arrangement of such a left head light 20 and a right head light 22, each head light 20, 22 being divided into 64 separate LEDs 58. For ease of understanding, an array, or matrix, of LEDs 60, 62 of each of the left head light 20 and the right head light 22 is shown schematically, viewed from the rear of the head light 20, 22.

In the depicted arrangement, the LEDs 58 are arranged in columns that are spaced apart in a horizontal direction along an x-axis, and in rows that are spaced apart in a vertical direction along a y-axis. Each LED 58 is controllable as an independent light source by the LCM 16, such that one or more of the LEDs 58 can be illuminated at any time to illuminate one or more of the spatially-distinct regions 57.

By virtue of the matrix arrangement, illumination of the LEDs 58 is controllable along both the x-axis and the y-axis. Controlling illumination of the LEDs 58 along the x-axis of the matrix effectively controls illumination of the spatially-distinct regions 57 around the vehicle 12, in a substantially circumferential direction. In contrast, controlling illumination of the LEDs 58 along the y-axis effectively controls illumination of the spatially-distinct regions 57 in a substantially radial direction, away from and towards the vehicle 12, such that illumination of a bottom row RR1 of the LED matrix 62 of the right-hand head lamp 22 illuminates one or more of the spatially-distinct regions 57 on the ground closest to the vehicle 12.

Figure 5:
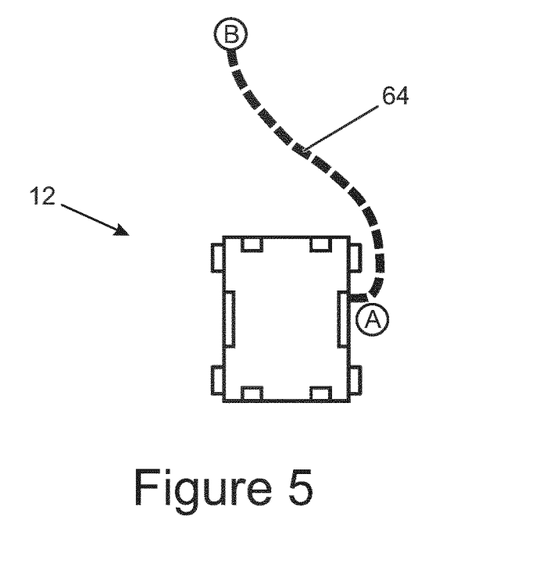
FIG. 5 is a schematic plan view of an actual path travelled by a user, the actual path extending from the vehicle comprising the vehicle lighting system of FIG. 1 to a location remote from the vehicle.

Operation of the vehicle lighting system 10 in use will now be described with reference to FIGS. 5 to 8. FIG. 5 shows a plan view of a stationary vehicle 12, along with a route, or actual path 64, travelled by the user from a location A at the vehicle 12 to a location B remote from the vehicle 12. In the depicted scenario, the user may have parked the vehicle 12 on the driveway outside of their house, the path 64 beginning at a door on the right-hand side of the vehicle 12 and extending towards the front of the vehicle 12. From here, the path 64 simultaneously extends away from the vehicle 12 and from the right-hand side towards the left-hand side of the vehicle 12, terminating at the front door of the house.

The vehicle lighting system 10 can be configured to be activated automatically in the event that one or more conditions are satisfied. For example, the vehicle lighting system 10 can employ one or more existing light-detecting sensors arranged on the vehicle 12 to detect light intensity external to the vehicle 12, the system 10 being automatically activated in the event that an engine of the vehicle 12 is switched off and the measured light intensity is below a pre-determined threshold level. Optionally, the user can manually activate the vehicle lighting system 10 prior to exiting the vehicle 12, in order to configure the system 10 to light the path 64 travelled by the user, illuminating the spatially-distinct regions 57 in dependence on the determined location of the remote device 38. The user can activate the vehicle lighting system 10 through interaction with the HMI of the vehicle 12, through the app installed on the remote device 38, or by any other appropriate means.

Figure 6:
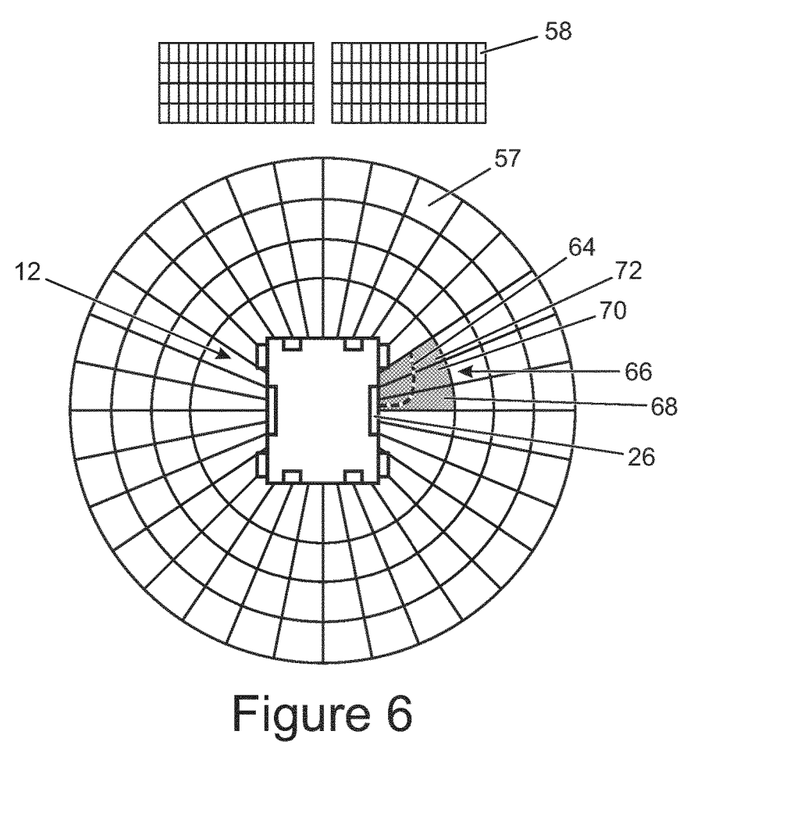
FIG. 6 is a first schematic plan view of a distinct illuminated path corresponding to a section of the actual route of FIG. 5, the distinct illuminated path comprising a number of the spatially-distinct regions of FIG. 4.

Upon parking the vehicle 12 and exiting by way of the door, the user is positioned to the right-hand side of the vehicle 12, as shown by the section of the actual path 64 displayed in FIG. 6. The Wi-Fi signals transmitted from the transmitter/receiver 40 of the remote device 38 are received by the transmitter/receivers 32, 34, 36 of the vehicle lighting system 10 (shown in FIG. 1), the CCM 18 calculating the co-ordinates of the remote device 38 through triangulation, as previously described. The CCM 18 thus locates the remote device 38, and by association, the user, at their position to the right-hand side of the vehicle 12.

By way of one or more look-up tables, the LCM 16 uses the co-ordinates of the remote device 38 to identify the one or more LEDs 58 that need to be illuminated in order to light an area of ground proximal to the remote device 38. The LCM 16 uses a first look-up table to convert the co-ordinates of the remote device 38 into an optical angle value, the optical angle being the angle between the calculated co-ordinates and a reference point on the vehicle 12. The optical angle is indicative of the direction and distance from the vehicle 12 of the spatially-distinct region 57 to be illuminated, and, as such, can be input into a second look-up table to convert the angle to an LED 58, or group of LEDs 58, that should be lit in order to illuminate the region 57 on the ground.

The step of converting the co-ordinates to the LEDs 58 to be illuminated may optionally be by way of a single look-up table, through direct mapping of the location of the remote device 38 to one or more appropriate LEDs 58. Alternatively, the selection of appropriate LEDs 58 in dependence on the location of the remote device 38 can be by way of a suitable algorithm. It will be appreciated that the conversion can be executed by the LCM 16, the ECU 14 or the CCM 18.

In the event that the user is positioned at the door of the vehicle 12, the LCM 16 determines that the most appropriate light sources to illuminate are LEDs 58 of the right side light 26. Illumination of the LEDs 58 is controlled to concentrate the intensity of light from the LEDs 58 onto the ground, creating a distinct illuminated path 66. FIG. 6 shows the distinct illuminated path 66 in the form of an illuminated region, the illuminated region 66 comprising a first spatially-distinct region 68, a second spatially-distinct region 70 contiguous with the first region 68 and positioned towards the front of the vehicle 12 relative to the first region 68, and a third spatially-distinct region 72 contiguous with the second region 70 and positioned towards the front of the vehicle 12 relative to the second region 70.

As the user travels along the path 64, the LCM 16 controls the LEDs 58 of the right side light 26 to sequentially illuminate the spatially-distinct regions 68, 70, 72, in order from the first region 68 to the third region 72, the spatially-distinct regions 68, 70, 72 remaining illuminated once lit. Therefore, as the vehicle lighting system 10 tracks the user's movement along the side of the vehicle 12, an illuminated region 66 enlarges to encompass the extending actual path 64 travelled by the user, effectively creating a moving light carpet.

Figure 7:
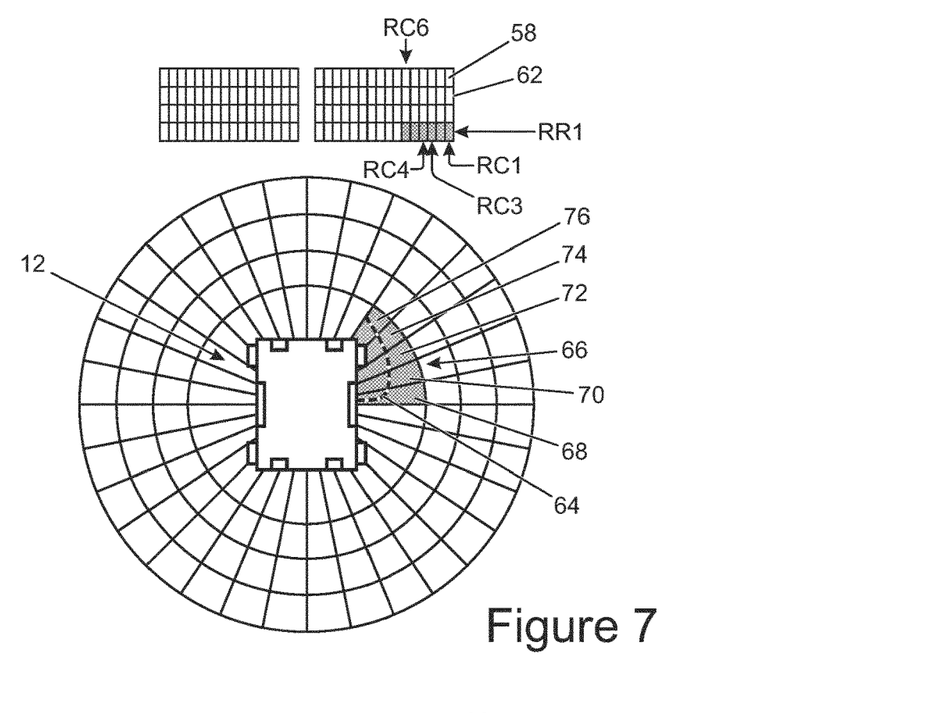
FIG. 7 is a second schematic plan view of a distinct illuminated path corresponding to a section of the actual route of FIG. 5, the distinct illuminated path comprising a number of the spatially-distinct regions of FIG. 4.

The illuminated region 66 continues to extend and enlarge as the user walks further along the path 64, the user being shown to begin crossing in front of the vehicle 12 in FIG. 7. At this stage, the CCM 18 of the vehicle lighting system 10 (the entirety of which is shown in FIG. 1) calculates that the remote device 38 (shown in FIG. 1) is positioned at a front right-hand corner of the vehicle 12, the LCM 16 making a determination that the optical angle of the remote device 38 corresponds to LEDs 58 of the right head light matrix 62. The LCM 16 configures the bottom row RR1 of the right head light array to be illuminated, from a column RC1 to a column RC3. As such, a fourth spatially-distinct region 74 is illuminated at the front right-hand corner of the vehicle 12.

Subsequently, a column RC4 to a column RC6 of row RR1 of the LED matrix 62 is illuminated, such that the LEDs 58 illuminate a fifth spatially-distinct region 76, the fifth spatially-distinct region 76 being contiguous with the fourth spatially-distinct region 74. The fourth and fifth spatially-distinct regions 74, 76 are therefore illuminated sequentially as the user progresses along the route 64, the first, second and third spatially-distinct regions 68, 70, 72 remaining illuminated.

Figure 8:
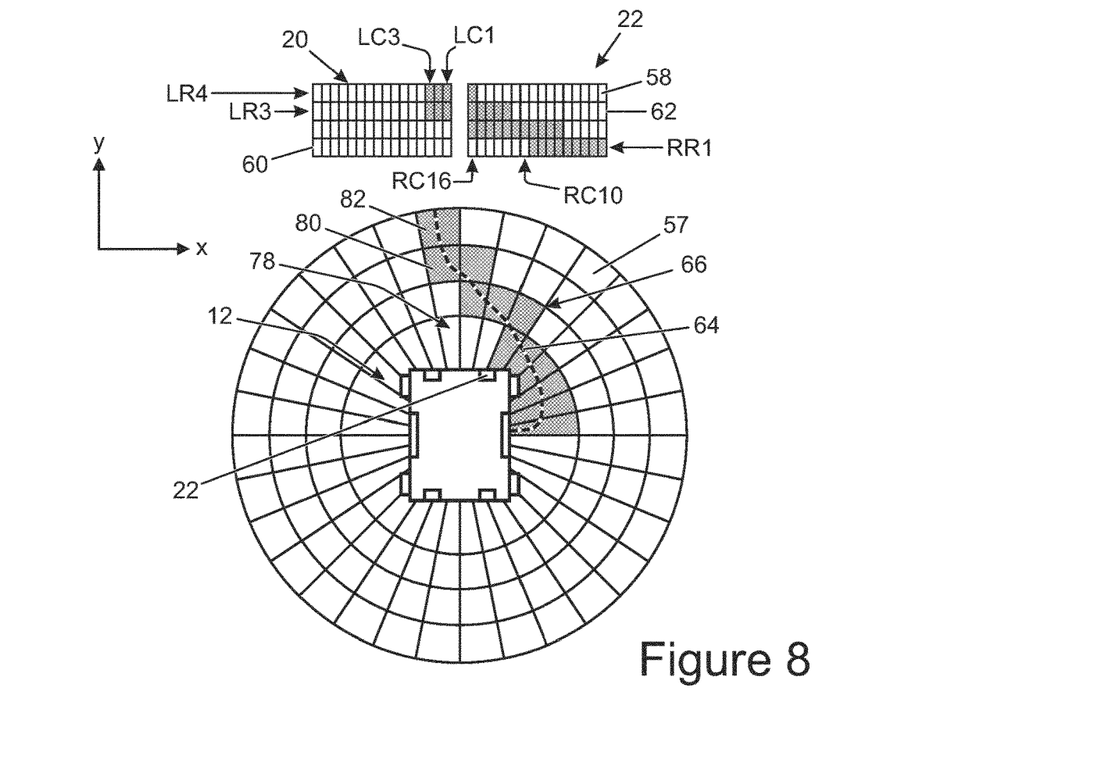
FIG. 8 is a schematic plan view of a distinct illuminated path corresponding to the entirety of the actual route of FIG. 5, the distinct illuminated path comprising a number of the spatially-distinct regions of FIG. 4.

Referring to FIG. 8, as the user continues to walk towards the door of their house, the vehicle lighting system 10 (shown in FIG. 1) tracks the movement of the remote device 38 (shown in FIG. 1) further along the actual path 64, and the spatially-distinct regions 57 continue to be sequentially illuminated to light the ground around the user. As the user moves away from the vehicle 12, the LCM 16 accordingly adjusts illumination of the LEDs 58 along the y-axis of the matrix 62 in addition to the x-axis, to illuminate spatially-distinct regions 57 further away from the vehicle 12. From a column RC10 to a column RC16 of the LED matrix 62 of the right head lamp 22, row RR1 of the LED matrix 62 remains unlit, defining a region of shadow 78 in between the vehicle 12 and the illuminated region 66.

As the user gets closer to their front door, they begin to pass across the front of the vehicle 12 from the right side to the left side of the vehicle 12. At this stage, the LCM 16 determines that the optical angle of the remote device 38 corresponds to LEDs 58 of the left head light 20. The LCM 16 accordingly initiates illumination of LEDs 58 of a row LR3 of the LED matrix 60 of the left head light 20, from a column LC1 to a column LC3, illuminating an $11^{th}$ spatially-distinct region 80 on the ground.

As the user proceeds to reach their door, the LCM 16 illuminates LEDs 58 of a fourth row LR4 of the LED matrix 60 of the left head light 20, from column LC1 to the column LC3. A corresponding $12^{th}$ spatially-distinct region 82 is therefore illuminated, the $12^{th}$ spatially-distinct region 82 being contiguous with the $11^{th}$ spatially-distinct region 80 and positioned further away from the vehicle 12. FIG. 8 shows the completed actual path 64 travelled by the user, the projected light carpet extending from the vehicle 12 to the user's front door, such that the entirety of the actual path 64 is illuminated by the LEDs 58 of the vehicle lighting system 10.

Figure 9:
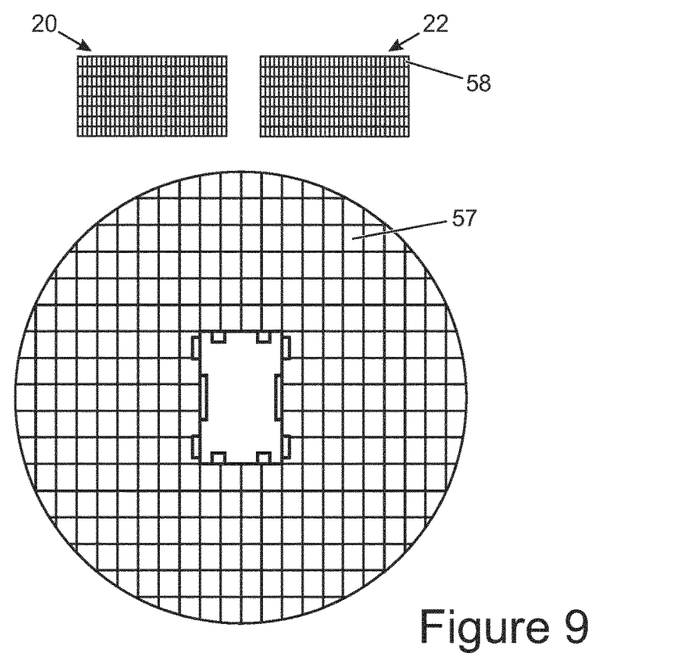
FIG. 9 is a schematic plan view of illuminable spatially-distinct regions corresponding to high-density LED matrices of an embodiment of the vehicle lighting system of FIG. 1, along with a schematic rear view of the high-density LED matrices of a right head lamp and a left head lamp of the vehicle lighting system.

FIG. 9 depicts another embodiment of the invention in which the head lights 20, 22, reverse lights 28, 30 and side lights 24, 26 are comprised of an array of LEDs 58. In the embodiment of FIG. 9, each head light 20, 22 is comprised of 128 LEDs 58, providing a high density matrix of LEDs 58 relative to the embodiment of FIG. 3 and FIGS. 5 to 8. The effect of the high density matrix is to increase the number of spatially-distinct regions 57 within the same area, thereby increasing the resolution at which a distinct illuminated path, or illuminated region, 66 may be projected on the ground. The LCM 16 can thus control the LEDs 58 to illuminate spatially-distinct regions 57 that correspond more closely to the actual path 64 travelled by the user.

Figure 10:
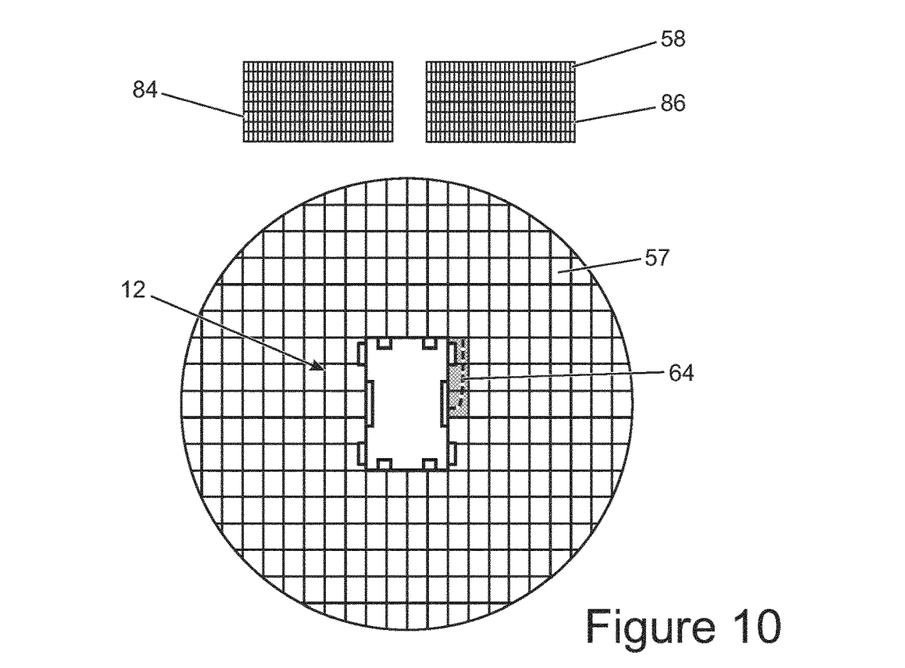
FIG. 10 is a first schematic plan view of a distinct illuminated path corresponding to a section of the actual route of FIG. 5, the distinct illuminated path comprising a number of the spatially-distinct regions of FIG. 9.
Figure 11:
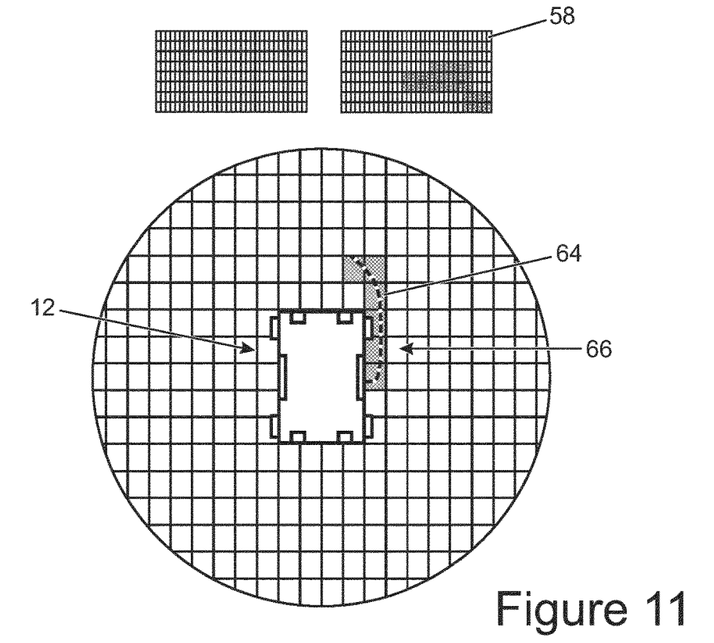
FIG. 11 is a second schematic plan view of a distinct illuminated path corresponding to a section of the actual route of FIG. 5, the distinct illuminated path comprising a number of the spatially-distinct regions of FIG. 9.
Figure 12:
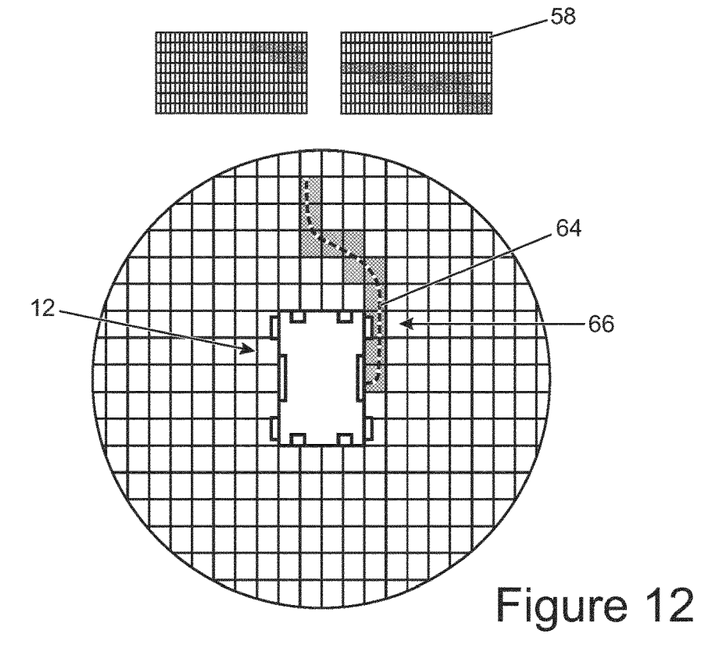
FIG. 12 is a schematic plan view of a distinct illuminated path corresponding to the entirety of the actual route of FIG. 5, the distinct illuminated path comprising a number of the spatially-distinct regions of FIG. 9.

FIGS. 10 to 12 depict the illumination of the actual path 64 of FIG. 5, in the case that the vehicle lighting system 10 (the entirety of which is shown in FIG. 1) is provided with high density LED matrices. In particular, FIGS. 10 to 12 show a high density matrix 84, 86 of LEDs 58 of the left head light 20 and the right head light 22, respectively. The operation of the system 10 is substantially as previously described, whereby spatially-distinct regions 57 on the ground are illuminated in dependence on the determined location of the remote device 38 (shown in FIG. 1). As can be seen from FIGS. 11 and 12 in particular, the resolution of the distinct illuminated path 66 projected on the ground corresponds almost exactly to the actual path 64 travelled by the user.

Controlling each spatially-distinct region 57 such that it remains lit once illuminated allows the user time to locate and retrieve any items they may have dropped on their way to the remote location. In the event that the user begins to re-trace their steps, the CCM 18 will track the location of the remote device 38 as it moves back along the actual path 64. In order to avoid dazzling the user as they get closer to the vehicle 12, the LCM 16 controls the LEDs 58 to begin extinguishing those spatially-distinct regions 57 furthest away from the vehicle 12, such that the distinct illuminated path 66 on the ground appears to shorten in a direction towards the vehicle 12.

The transmitter/receivers 32, 34, 36 of the vehicle lighting system 10 are configured to operate to a pre-determined maximum distance, thereby defining an illuminable zone on the ground. The transmitter/receivers 32, 34, 36 will not locate the remote device 38 once the distance between the remote device 38 and one or more of the transmitter/receivers 32, 34, 36 of the vehicle lighting system 10 exceeds this pre-determined maximum distance. The vehicle lighting system 10 is configured to switch off the light sources when one or more of the transmitter/receivers 32, 34, 36 cannot detect the remote device 38, such that the illuminated region 66 is extinguished when the user travels outside of this illuminable zone.

The vehicle lighting system 10 is configured to extinguish the illuminated region 66 after a pre-determined time period, for example five minutes after illumination of the first spatially-distinct region 68. Alternatively, the pre-determined time period may begin when the transmitter/receivers 32, 34, 36 of the vehicle lighting system 10 no longer detect movement of the remote device 38. In this instance, lack of movement of the remote device 38 may be a result of the user moving outside of the illuminable zone, or a result of the user reaching their front door. The time period may be user-defined, or may be a pre-set time period stored within a memory device of the vehicle lighting system 10. The distinct illuminated path 66 remains illuminated until the pre-determined time period has elapsed.

In addition to selecting and controlling the one or more light sources to be illuminated, the LCM 16 can be configured to adjust the brightness of each light source, thereby controlling the light intensity of the illuminated region 66. For example, the LCM may control the LEDs 58 corresponding to spatially-distinct regions 57 further from the vehicle to be brighter than those LEDs 58 corresponding to spatially-distinct regions 57 close to the vehicle 12, effectively creating a gradient of brightness along the y-axis of the LED matrix 60, 62, 84, 86. As such, the light intensity of the illuminated region 66 projected on the ground may be substantially constant along the length of the user's actual path 64, so that the user does not experience a dimming of the illuminated region 66 as they travel further from the vehicle 12.

The vehicle lighting system 10 may additionally be provided with a memory function, such that the ECU 14 is configured to store a distinct illuminated path 66 corresponding to a common actual path 64 travelled by the user. In this case, the vehicle lighting system 10 is provided with a GPS module that is connected to the CCM 18, such that the vehicle lighting system 10 can record the distinct illuminated path 66 corresponding to each vehicle location. Once a particular distinct illuminated path 66 has been recorded for one vehicle location a pre-determined number of times, the vehicle lighting system 10 can be configured to automatically illuminate the distinct path 66 when the user exits the vehicle 12 at the location. The entirety of the actual path 64 travelled by the user can be illuminated at once, such that the light carpet extends from the vehicle 12 to the remote location. The HMI of the vehicle 12 may prompt the user to accept or decline automatic illumination of the light carpet prior to the user leaving the vehicle 12.

A second user can optionally connect to the vehicle lighting system 10. In this case, a first distinct illuminated path 66 corresponding to a first user is projected on the ground in dependence upon the location of the first user, and a second distinct illuminated path 66A corresponding to the second user is projected on the ground in dependence upon the location of the second user. Each user has a separate remote device 38, 38A, each remote device having a transmitter/receiver 40, 40A configured to send signals to the one or more transmitter/receivers 32, 34, 36 of the vehicle lighting system 10. The CCM 18 is therefore able to identify the location of a first remote device 38 and the location of a second remote device 38A, associated with the first and second users, respectively. The LCM 16 calculates the optical angles of the first and second remote devices 38, 38A, determining which of the light sources to illuminate, creating two moving light carpets on the ground. The first and/or second user can alternatively be detected by way of a vehicle camera or any other suitable detection means.

The light sources of the vehicle lighting system 10 can additionally, or alternatively, be comprised of rotatable head lights, rotatable rear lights and/or rotatable side lights. The rotatable lights have the ability to mechanically swivel to project the distinct illuminated path 66 on the ground, creating a moving light carpet that smoothly tracks the position of the user. Alternatively, head lights 20, 22, rear lights 28, 30 and/or side lights 24, 26 may each be comprised of a matrix of LEDs, as previously described, each LED being arranged to swivel or otherwise move independently. In the event that the lighting system 10 is provided with such moveable light sources, the LCM 16 can use the calculated optical angle to both select an appropriate light source to illuminate and to determine an appropriate angle of rotation of the respective light source. The selected light source can thus be oriented so as to project the distinct illuminated path 66 on the ground at the user's location.

It will be appreciated that the shape of the spatially-distinct regions 57 and the shape of the illuminated region 66 depicted in the figures are purely for illustrative purposes, and the invention is not restricted to these embodiments. In reality, the nature of the regions of illumination is dependent upon the nature and control of the light sources.

Many modifications may be made to the above examples without departing from the scope of the present invention as defined in the accompanying claims.

The invention claimed is:

1. A method of guiding a user approaching or exiting a vehicle, the method comprising:
   projecting, by means of illumination from one or more light sources associated with the vehicle, a distinct illuminated path on the ground extending between the vehicle and a location remote from the vehicle;
   tracking movement of the user in a vicinity of the vehicle;
   progressively projecting the distinct illuminated path on the ground as the user moves between the vehicle and the location remote from the vehicle such that an actual path of the user is progressively illuminated on the ground as the user moves between the vehicle and the location remote from the vehicle, wherein projecting the distinct illuminated path on the ground comprises selectively activating at least one of a plurality of light sources arranged in a matrix;
   tracking movement of the user relative to the vehicle by means of one or more cameras associated with the vehicle;
   recording a plurality of distinct paths traversed by the user at multiple vehicle locations, each distinct path comprising a path extending between the vehicle at a respective vehicle location and a corresponding location remote from the vehicle at the respective vehicle location; and
   storing the plurality of recorded distinct paths as predefined paths associated with respective vehicle locations, wherein the distinct illuminated path projected on the ground corresponds substantially to a stored predefined path associated with a current vehicle location.

2. The method of claim 1, further comprising continuing to project the distinct illuminated path on the ground when the user arrives at the vehicle or at the location remote from the vehicle, such that the actual path traversed by the user remains illuminated when the user arrives at the vehicle or at the location remote from the vehicle.

3. The method of claim 1, further comprising tracking the movement of the user relative to the vehicle by communicating with a mobile communications device in possession of the user.

4. The method of claim 1, further comprising projecting the distinct illuminated path on the ground, or commencing projection of at least part of the distinct illuminated path on the ground, when the user exits the vehicle or when the user is detected at the location remote from the vehicle.

5. The method of claim 1, further comprising progressively activating selected light sources in the matrix such that the distinct illuminated path is progressively projected on the ground.

6. The method of claim 1, further comprising selectively activating the light sources in the matrix in dependence upon a detected location of the user in the vicinity of the vehicle, wherein the light sources in the matrix are selectively activated to illuminate the ground at the detected location of the user.

7. A light guidance system configured to perform the method of claim 1.

8. A light guidance system for a vehicle, the light guidance system comprising:
- one or more light sources associated with the vehicle and configured to project at least part of a distinct illuminated path on the ground between the vehicle and a location remote from the vehicle;
- one or more locating devices for determining a location of a user relative to the vehicle;
- a controller configured to selectively activate the one or more light sources to illuminate the ground at the location of the user,
- one or more cameras associated with the vehicle configured to track movement of the user between the vehicle and the location remote from the vehicle and to progressively illuminate the ground along an actual path traversed by the user;
- a memory device configured to store a plurality of recorded distinct paths traversed by the user at multiple vehicle locations, each distinct path comprising a path extending between the vehicle at a respective vehicle location and a corresponding location remote from the vehicle at the respective vehicle location;
- one or more vehicle light units having a plurality of light sources arranged in a matrix, each light source being arranged to illuminate a distinct region of the ground in the vicinity of the vehicle, wherein the distinct illuminated path projected on the ground corresponds substantially to a stored predefined path associated with a current vehicle location.

9. The light guidance system of claim 8, wherein, in use, one or more of the light sources in the matrix are selectively activated to project at least part of the distinct illuminated path on the ground.

10. The light guidance system of claim 9, wherein the one or more vehicle light units comprise one or more of the following: headlights, reverse lights, side lights and auxiliary lights of the vehicle.

11. The light guidance system of claim 8, wherein the one or more locating devices comprises either or both of one or more transmitters and one or more receivers that are associated with the vehicle and configured to communicate with a mobile communications device in possession of the user.

12. The light guidance system of claim 11, further comprising a plurality of receiver units associated with the vehicle and wherein the controller is configured to determine the location of the user based upon at least one of the following: relative strengths and time of flight of signals received by each receiver unit from the mobile communications device.

13. The light guidance system of claim 11, wherein communication with the mobile communications device is via Wi-Fi, Bluetooth® or PEPS/ePEPs ((enhanced) passive entry/passive start) protocols.

14. The light guidance system of claim 11, wherein the mobile communications device is a mobile phone or key fob.

15. The light guidance system of claim 8, wherein the one or more locating devices comprises one or more cameras associated with the vehicle.

16. A vehicle comprising the light guidance system of claim 8.

* * * * *